(12) United States Patent
Spyche, Jr. et al.

(10) Patent No.: US 9,133,902 B2
(45) Date of Patent: Sep. 15, 2015

(54) SHOCK ABSORBER WITH VARIABLE DAMPING PROFILE

(71) Applicant: Kyntec Corporation, Cheektowaga, NY (US)

(72) Inventors: Gerald J. Spyche, Jr., South Wales, NY (US); Allan J. Jopp, Tonawanda, NY (US); Joseph Schoen, Clarence, NY (US); Scott J. Taylor, Amherst, NY (US)

(73) Assignee: Kyntec Corporation, Buffalo, NY (US)

( * ) Notice: Subject to any disclaimer, the term of this patent is extended or adjusted under 35 U.S.C. 154(b) by 0 days.

(21) Appl. No.: 14/159,135

(22) Filed: Jan. 20, 2014

(65) Prior Publication Data

US 2014/0202808 A1 Jul. 24, 2014

Related U.S. Application Data

(60) Provisional application No. 61/755,051, filed on Jan. 22, 2013, provisional application No. 61/827,900, filed on May 28, 2013, provisional application No. 61/861,115, filed on Aug. 1, 2013.

(51) Int. Cl.
*F16F 9/48* (2006.01)
*F16F 9/512* (2006.01)
*F16F 9/346* (2006.01)
*F16F 9/44* (2006.01)

(52) U.S. Cl.
CPC .............. *F16F 9/512* (2013.01); *F16F 9/346* (2013.01); *F16F 9/44* (2013.01); *F16F 9/48* (2013.01)

(58) Field of Classification Search
USPC ................................ 188/286, 287
See application file for complete search history.

(56) References Cited

U.S. PATENT DOCUMENTS

| | | | | |
|---|---|---|---|---|
| 3,840,097 | A | | 10/1974 | Holley |
| 4,059,175 | A | * | 11/1977 | Dressell et al. .............. 188/285 |
| 4,071,122 | A | * | 1/1978 | Schupner ..................... 188/285 |
| 4,690,255 | A | * | 9/1987 | Heideman .................... 188/287 |
| 5,598,904 | A | * | 2/1997 | Spyche, Jr. ................... 188/287 |
| 6,065,573 | A | * | 5/2000 | Kelly ......................... 188/319.1 |
| 6,974,002 | B2 | * | 12/2005 | Heideman .................... 188/285 |
| 7,055,661 | B2 | * | 6/2006 | Bertrand et al. .............. 188/287 |
| 2004/0020729 | A1 | | 2/2004 | Bertrand et al. |
| 2004/0094376 | A1 | | 5/2004 | van Wonderen et al. |

OTHER PUBLICATIONS

PCT Search Report and Written Opinion for PCT/US2014/012246.

* cited by examiner

*Primary Examiner* — Christopher Schwartz
(74) *Attorney, Agent, or Firm* — Jaeckle Fleischmann & Mugel, LLP

(57) ABSTRACT

Disclosed herein in an energy absorption device that incorporates a diverse range of uses within a single shock absorber. The disclosed energy absorption device is a novel combination of interaction between various components (e.g., piston head, shock tube, cylinder end, external cylinder, and adjustment mechanism) within a single shock absorber. When the components disclosed herein are considered together and designed as an interrelated assembly, the ability to incorporate such a diverse range of uses within a single device emerges. The ability to combine dashpot, square wave, progressive wave, and self-compensating damping in a single device is unprecedented, as is the ability to deliver sublinear damping force vs. input velocity performance in an adjustable device. The disclosed device allows a user to make simpler sizing calculations and decisions, and provides the user with the ability to adjust the shock absorber to a specific application, for example, with the turn of an adjustment knob.

20 Claims, 6 Drawing Sheets

SHOCK ABSORBER WITH VARIABLE DAMPING PROFILE

RELATED APPLICATIONS

This application claims the benefit of U.S. Provisional Application No. 61/755,051, filed on Jan. 22, 2013, U.S. Provisional Application No. 61/827,900, filed on May 28, 2013, and U.S. Provisional Application No. 61/861,115, filed on Aug. 1, 2013. The entire teachings of the above applications are incorporated herein by reference.

BACKGROUND OF THE INVENTION

Most traditional non-adjustable shock absorbers can be designed to individually deliver progressive, square wave, dashpot, or self-compensating shock force vs. stroke profiles, but force a user to select between individual shock absorber units, each with a single damping profile. These traditional shock absorbers are, therefore, tuned to narrow performance bands within the specific shock force vs. stoke profile selected, and cannot compensate for changes in conditions of operation, including variations in load and impact velocity. Other traditional shock absorbers allow for adjustable damping only in a square wave or dashpot damping profile, which may not be well suited for specific fragile load applications. One such example shock absorber is described in U.S. Pat. No. 5,598,904 and uses a spiral groove to both provide a flow path for oil as well as to cut off or meter fluid flow out of an orifice.

SUMMARY OF THE INVENTION

The device disclosed herein, on the other hand, incorporates a diverse range of uses within a single shock absorber device. The device disclosed herein is a novel combination of interaction between various components (e.g., piston head, shock tube, cylinder end, external cylinder, and adjustment mechanism) within a single shock absorber. Interaction of this degree is not found elsewhere in industry, where the highest degree of complexity in previous devices is limited to interaction between, for example, three parts. When the components disclosed herein are considered together and designed as an interrelated assembly, the ability to incorporate such a diverse range of uses within a single device emerges.

One example embodiment of the present invention is an energy absorption device that includes an external cylinder housing member, shock tube, piston, and accumulator. The external cylinder has a distal end, a proximal end, an interior wall, and a flow channel formed on the interior wall of the external cylinder. The flow channel substantially extends along the length of the external cylinder and is in fluid communication with the accumulator. The piston includes a head portion and a rod portion. The head portion is slidably retained within the shock tube, and the rod portion extends from the head portion through the proximal end of the external cylinder and engages with an external body in motion. The accumulator is contained within the external cylinder and collects fluid from the interior of the shock tube when the head portion of the piston moves toward the distal end of the external cylinder.

The shock tube is rotatably secured within the external cylinder and has an interior surface, an exterior surface, and a group of inline holes along the long axis of the shock tube. Each hole passes from the interior surface of the shock tube to the exterior surface of the shock tube to allow fluid to pass therethrough. The shock tube also has a tapered patch on the exterior surface of the shock tube. The tapered patch starts at the location of the group of inline holes and is of a first depth into the exterior surface of the shock tube. The tapered patch ends at another location around the circumference of the shock tube and is of a second depth into the exterior surface of the shock tube. The second depth is less than the first depth, and the depth of the tapered patch tapers from the first depth to the second depth.

Relative rotation between the shock tube and the external cylinder changes which part of the tapered patch interfaces the flow channel to adjustably change the rate of fluid flow out of the shock tube, through the group of inline holes, through the tapered patch, through the flow channel, and into the accumulator. Such rotation, thus, changes the dampening of the energy absorption device.

In many embodiments, the tapered patch may extend substantially around the circumference of the shock tube (e.g., about 350 degrees around the circumference of the shock tube), the length of the tapered patch along the long axis of the shock tube can span the group of inline holes, and the width of the flow channel may be at least the width of the group of inline holes. In many embodiments, the first depth of the tapered patch may be substantially the thickness of the shock tube, and the second depth of the tapered patch may be zero or near-zero, for example. In many embodiments, the dampening of the energy absorption device is based on a projected area of the width and depth of the tapered patch at the point interfacing the flow channel at a given time.

In some embodiments, the energy absorption device includes multiple groups of inline holes along the long axis of the shock tube, where each group of inline holes is positioned at different locations around the circumference of the shock tube. Such embodiments may include multiple tapered patches corresponding to the multiple groups of inline holes, where each tapered patch starts at the location of a corresponding group of inline holes. In embodiments with multiple groups of inline holes, each group of inline holes can provide a different type of damping (e.g., square wave damping, dashpot damping, progressive damping, or self-compensating damping). In embodiments with multiple groups of inline holes, the energy absorption device may include one or more flow channels. Embodiments with multiple groups of inline holes and one flow channel allow a user to select which tapered patch interfaces the flow channel. Alternatively, the energy absorption device may include multiple flow channels corresponding to the multiple groups of inline holes, where each flow channel is formed at a different location around the interior wall of the external cylinder.

Another example embodiment of the present invention is an energy absorption device that includes an external cylinder housing member, shock tube, piston, and accumulator. The external cylinder has a distal end, a proximal end, an interior wall, and a flow channel formed on the interior wall of the external cylinder. The flow channel substantially extends along the length of the external cylinder and is in fluid communication with the accumulator. The piston includes a head portion and a rod portion. The head portion is slidably retained within the shock tube, and the rod portion extends from the head portion through the proximal end of the external cylinder and engages with an external body in motion. The accumulator is contained within the external cylinder and collects fluid from the interior of the shock tube when the head portion of the piston moves toward the distal end of the external cylinder.

The shock tube is rotatably secured within the external cylinder and has an interior surface, an exterior surface, and a group of inline holes along the long axis of the shock tube. Each hole passes from the interior surface of the shock tube to the exterior surface of the shock tube to allow fluid to pass therethrough. The shock tube also has a group of tapered grooves, corresponding to the group of inline holes, on the exterior surface of the shock tube. Each tapered groove starts at the location of a corresponding hole and is of a first depth into the exterior surface of the shock tube. Each tapered groove ends at another location around the circumference of the shock tube and is of a second depth into the exterior surface of the shock tube. The second depth of the groove is less than the first depth of the groove, and the depth of the groove tapers from the first depth to the second depth.

Relative rotation between the shock tube and the external cylinder changes which parts of the tapered grooves interface the flow channel to adjustably change the rate of fluid flow out of the shock tube, through the group of inline holes, through the tapered grooves, through the flow channel, and into the accumulator. Such rotation, thus, changes the dampening of the energy absorption device.

In many embodiments, the tapered grooves may extend substantially around the circumference of the shock tube (e.g., about 350 degrees around the circumference of the shock tube). In other embodiments, the tapered grooves can end at different locations around the circumference of the shock tube. The width of the flow channel may be at least the width of the group of inline holes. In many embodiments, the first depth of the tapered grooves may be substantially the thickness of the shock tube, and the second depth of the tapered grooves may be zero or near-zero, for example. In many embodiments, the dampening of the energy absorption device is based on a cumulative projected area of the width and depth of the tapered grooves at the points interfacing the flow channel at a given time.

In some embodiments, the energy absorption device includes multiple groups of inline holes along the long axis of the shock tube, where each group of inline holes is positioned at different locations around the circumference of the shock tube. Such embodiments may include multiple groups of tapered grooves corresponding to the multiple groups of inline holes, where each group of tapered grooves starts at the location of a corresponding group of inline holes. In embodiments with multiple groups of inline holes, each group of inline holes can provide a different type of damping (e.g., square wave damping, dashpot damping, progressive damping, or self-compensating damping). In embodiments with multiple groups of inline holes, the energy absorption device may include one or more flow channels. Embodiments with multiple groups of inline holes and one flow channel allow a user to select which group of tapered grooves interfaces the flow channel. Alternatively, the energy absorption device may include multiple flow channels corresponding to the multiple groups of tapered grooves, where each flow channel is formed at a different location around the interior wall of the external cylinder.

Another example embodiment of the present invention is an energy absorption device that includes an external cylinder housing member, shock tube, piston, and accumulator. The external cylinder has a distal end, a proximal end, an interior wall, and a flow channel formed on the interior wall of the external cylinder. The flow channel substantially extends along the length of the external cylinder and is in fluid communication with the accumulator. The piston includes a head portion and a rod portion. The head portion is slidably retained within the shock tube, and the rod portion extends from the head portion through the proximal end of the external cylinder and engages with an external body in motion. The accumulator is contained within the external cylinder and collects fluid from the interior of the shock tube when the head portion of the piston moves toward the distal end of the external cylinder.

The shock tube is rotatably secured within the external cylinder and has an interior surface, an exterior surface, and multiple groups of holes. Each group of holes are positioned at different locations around the circumference of the shock tube, and each hole passes from the interior surface of the shock tube to the exterior surface of the shock tube to allow fluid to pass therethrough.

The flow channel has a width so as to align with one group of the multiple groups of holes at a time. Relative rotation between the shock tube and the external cylinder changes which group of holes are aligned with the flow channel to selectably change the rate of fluid flow out of the shock tube, through the holes aligned with the flow channel, through the flow channel, and into the accumulator. Such rotation, thus, changes the dampening of the energy absorption device.

In many embodiments, each group of holes can provide a different type of damping (e.g., square wave damping, dashpot damping, progressive damping, or self-compensating damping). In some embodiments, the flow channel varies in width along its length, and in some embodiments the multiple groups of holes can be arranged in a spiral pattern around the circumference of the shock tube.

In any of the disclosed embodiments, the energy absorption device may also include a cylinder end at the proximal end of the external cylinder, an end groove on the exterior surface of the cylinder end, a first orifice in the cylinder end, and a second orifice in the shock tube. The end groove starts at a first location on the exterior surface of the cylinder end and is of a first depth into the exterior surface of the cylinder end. The end groove ends at a second location around the circumference of the cylinder end and is of a second depth into the exterior surface of the cylinder end. The second depth of the end groove is less than the first depth of the end groove, and the depth of the end groove tapers from the first depth of the end groove to the second depth of the end groove. The first orifice (in the cylinder end) is in fluid communication with the interior of the shock tube and the end groove, and allows fluid to flow from the interior of the shock tube to the end groove when the head portion of the piston moves toward the proximal end of the external cylinder. The second orifice (in the shock tube) is in fluid communication with the end groove and the accumulator, and allows fluid to flow from the end groove to the accumulator when the head portion of the piston moves toward the proximal end of the external cylinder. Relative rotation between the shock tube and the external cylinder changes which part of the end groove interfaces the second orifice (in the shock tube) to adjustably change the rate of fluid flow out of the shock tube, through the first orifice (in the cylinder end), through the end groove, through the second orifice (in the shock tube), and into the accumulator. Such rotation changes the dampening of the energy absorption device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The device disclosed herein is a novel combination of interaction between features of various components (e.g., piston head, shock tube, cylinder end, external cylinder, and adjustment mechanism) within a single shock absorber. Designing and developing such parts to interact together and behave in a predictable way is neither obvious nor easy. Nonlinearities in flow, flow paths, interaction effects of multiple flow paths, and deliberate engineering of flow channels to be either active or inactive depending on customer orientation of the device has not been accomplished by others. The device disclosed herein combines into a single shock absorber the ability to select the most advantageous shock force vs. stroke damping profile for a given application, and to combine into a single device the ability to select damping characteristics previously unable to be combined in a single device. This allows a user of the shock absorber to make a single, simplified product selection decision, and to then adjust the device to deliver the exact performance that the user desires for a specific application of the shock absorber.

Figure 1:
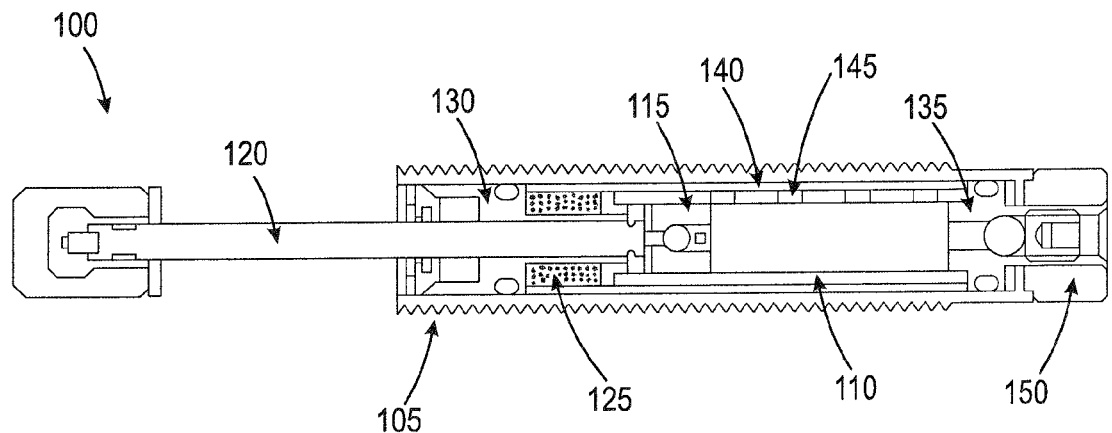
FIG. 1 is a cross-section schematic drawing of an energy absorption device according to an example embodiment of the invention.

FIG. 1 is a cross-section schematic drawing of an energy absorption device 100 according to an example embodiment of the invention. FIG. 1 shows example components of the device 100 in alignment with each other. The embodiment shown in FIG. 1 includes a piston head 115 that moves axially under load internal to an internal cylinder (shock tube) 110. The shock tube 110 is positioned internal to a second cylinder (external cylinder) 105 and connected to a component at the far end of the external cylinder, a distal cylinder end 135. The shock tube 110 and cylinder end 135 are a close mechanical fit between the outside diameter of the shock tube 110 and the inside diameter of the external cylinder 135, but are able to be rotated through an externally located adjustment component (e.g., adjustment knob) 150. The inside diameter of the external cylinder 105 is round, but is interrupted by a flow channel 140 running axially down one side of the device 100 to an accumulator 125. This flow channel 140 may be of constant area or may be configured to be variable in size vs. its position on the external cylinder's axis.

The shock tube 110 can be configured with multiple arrangements of holes (groups of holes) 145, with each group being restricted to an area on the shock tube 110 in approximately the same size as the flow channel 145 on the inside diameter surface of the external cylinder 105. Each group of holes 145 may be called an "orifice pattern" and, along with the flow channel 145, determines the effective damping performance of the device 100. Multiple orifice patterns may be incorporated into a single shock tube, with each pattern being tuned to deliver optimum performance under different input conditions. A user can select which pattern to activate by rotating the shock tube 100 relative to the external cylinder 105. In some embodiments, the orifice patterns 145 can be constructed in a spiral configuration, with the configuration being designed in concert with the flow channel 145 in the inside diameter wall of the external cylinder 105. This configuration effectively delivers square wave damping in the device, which a user can adjust in a manner similar to traditional adjustable shock absorbers.

The ability to combine dashpot, square wave, and progressive wave, and self-compensating damping in a single device 100 is itself unprecedented, as is the ability to deliver sublinear damping force vs. input velocity performance in an adjustable device. It allows a user of the device 100 to make a much simpler sizing calculation and decision, and provides the user with the ability to easily and simply adjust the shock absorber 100 to a specific application, for example, with the turn of an adjustment knob 150. It also reduces product variation in the manufacturing process, providing economy of scale in manufacturing quantities at much lower levels than those afforded by traditional shock absorber models.

Figure 2:
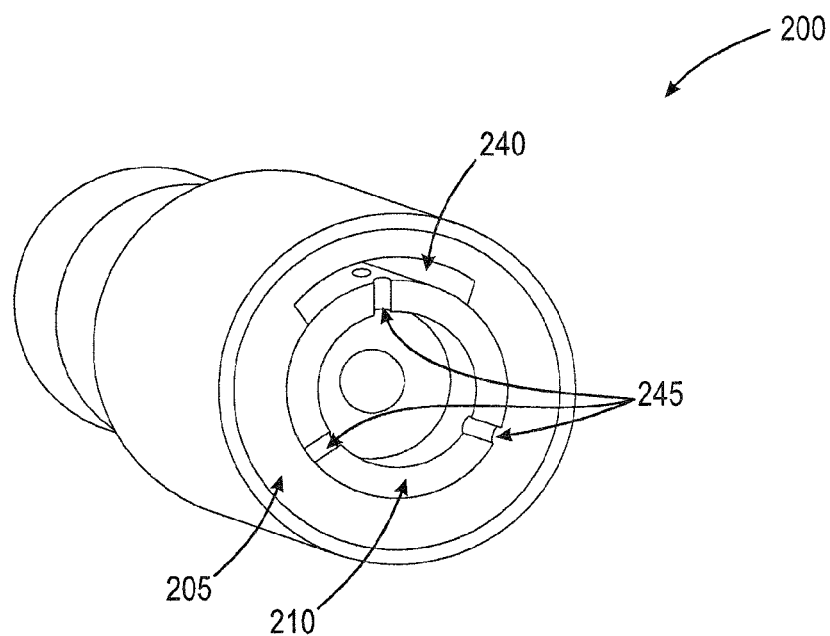
FIG. 2 is a cross-section schematic drawing of an energy absorption device according to an example embodiment of the invention.

FIG. 2 is a cross-section schematic drawing of an energy absorption device 200 according to an example embodiment of the invention. FIG. 2 shows an example flow channel 240 on the inner diameter of the external cylinder 205 in more detail, as well as a shock tube 210 containing three orifice patterns 245. The illustrated example embodiment shows that because the flow channel 240 may only align with one of the three orifice patters 245 at a time, only one of the orifice patterns 245 may be active at any given time, allowing the example device 200 shown in FIG. 2 to act as three separate shock absorbers in one device.

Figure 3A:
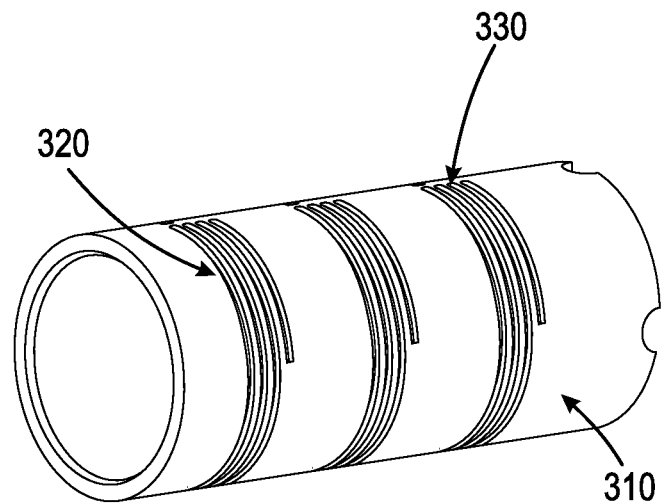
FIGS. 3A and 3B are schematic drawings of a shock tube with tapered grooves according to an example embodiment of the invention.
Figure 3B:
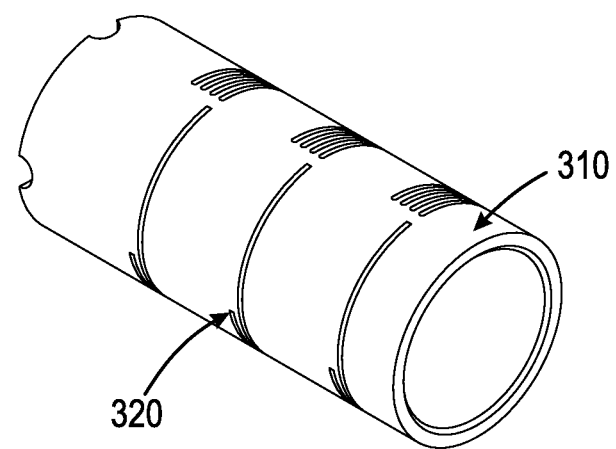
Figure 4A:
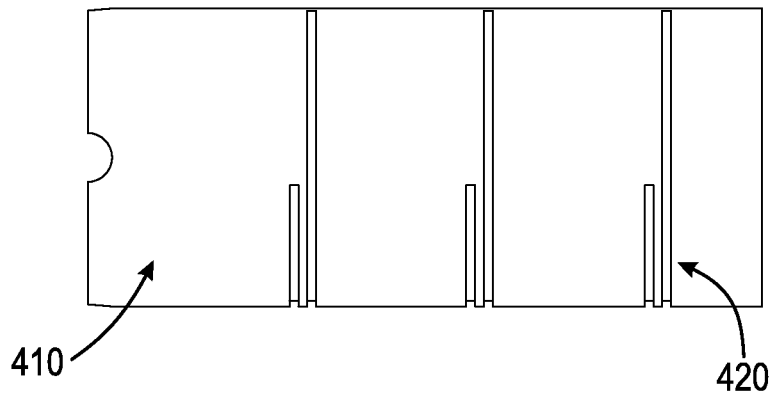
FIGS. 4A-4D are schematic drawings of a shock tube with tapered grooves according to an example embodiment of the invention.
Figure 4B:
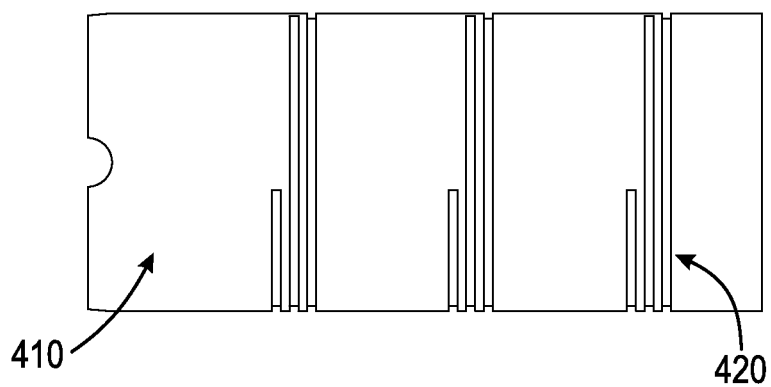
Figure 4C:
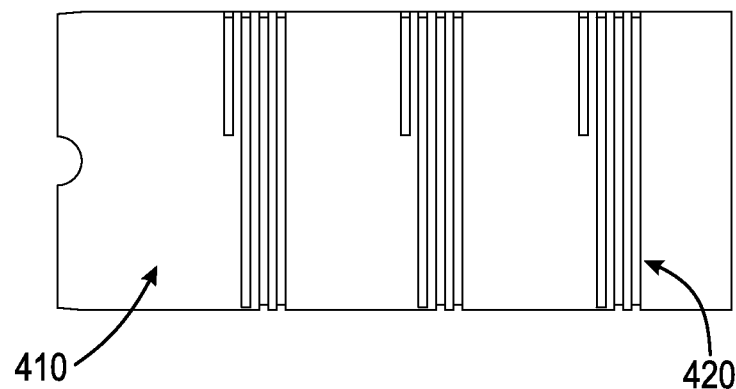
Figure 4D:
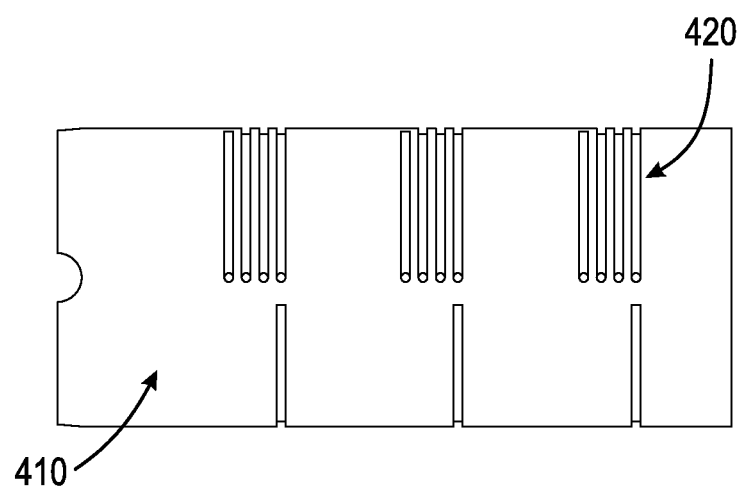

FIGS. 3A and 3B are schematic drawings of a shock tube 310 with tapered grooves 320 according to an example embodiment of the invention. The example shock tube 310 shown in FIGS. 3A and 3B includes on the outside diameter of the shock tube 310 at least one circumferential tapered groove 320. The tapered groove(s) 320 at one end is of a certain depth in the shock tube 310 and tapers to a lesser depth at the other end of the groove(s) 320. For example, the tapered groove 320 may extend about 350 degrees around the outside diameter of the shock tube 310, and may start at a certain depth at one end and taper to a depth of zero at the other end of the groove 320, about 350 degrees from where the groove 320 started. A slot cut axially along the length of the external cylinder (not shown) interfaces the groove 320 to allow for oil/fluid to flow through the orifices 330, groove 320, and slot (not shown). The slot is similar to that of the flow channel 240 shown in FIG. 2, but may be much narrower.

When the slot of the external cylinder is aligned with a certain part of the tapered groove 320, the tapered groove 320 presents a resulting projected area and flow path for the oil/fluid of the device to travel. The projected area is based on the width and depth of the groove 320 and the width of the slot. When the shock tube 310 is rotated relative to the external cylinder, the slot of the external cylinder is aligned with different parts of the tapered groove 320. As the depth of the groove 320 changes, due to rotation of the shock tube 310 relative to the external cylinder, so does the projected area through which the oil/fluid may travel. By rotating the shock tube 310 relative to the external cylinder and, thus, changing the projected area, the shock absorber damping can be adjusted. In some embodiments, various orifices 330 of the shock tube may have different start and end points along the groove 320 to achieve variable rotational flow cut off channels. In further or other embodiments, the shock tube 310 may include multiple tapered grooves 320 that start and end at differing points around the shock tube 310.

The example shock 310 tube of FIGS. 3A and 3B is suitable for use in an energy absorption device that includes an external cylinder housing member, shock tube 310, piston, and accumulator, where the shock tube 310 is rotatably secured within the external cylinder and has an interior surface, an exterior surface, and a group of inline holes 330 along the long axis of the shock tube 310. In such a device, each hole 330 passes from the interior surface of the shock tube 310 to the exterior surface of the shock tube 310 to allow fluid to pass therethrough. The shock tube 310 also has a group of tapered grooves 320, corresponding to the group of inline holes 330, on the exterior surface of the shock tube 310. Each tapered groove 320 starts at the location of a corresponding hole 330 and is of a first depth into the exterior surface of the shock tube. Each tapered groove 320 ends at another location around the circumference of the shock tube 310 and is of a second depth into the exterior surface of the shock tube 310. The second depth of the groove 320 is less than the first depth of the groove 320, and the depth of the groove 320 tapers from the first depth to the second depth.

In such an energy absorption device, the external cylinder has a distal end, a proximal end, an interior wall, and a flow channel formed on the interior wall of the external cylinder (not shown). The flow channel substantially extends along the length of the external cylinder and is in fluid communication with the accumulator. The piston includes a head portion and a rod portion. The head portion is slidably retained within the shock tube, and the rod portion extends from the head portion through the proximal end of the external cylinder and engages with an external body in motion. The accumulator is contained within the external cylinder and collects fluid from the interior of the shock tube when the head portion of the piston moves toward the distal end of the external cylinder. Relative rotation between the shock tube 310 and the external cylinder changes which parts of the tapered grooves 320 interface the flow channel to adjustably change the rate of fluid flow out of the shock tube, through the group of inline holes 330, through the tapered grooves 320, through the flow channel, and into the accumulator. Such rotation, thus, changes the dampening of the energy absorption device.

FIGS. 4A-4D are schematic drawings of a shock tube 410 with tapered grooves 420 according to an example embodiment of the invention. FIGS. 4A-4D show various views of an example shock tube 410 having multiple circumferential tapered grooves 420.

Figure 5A:
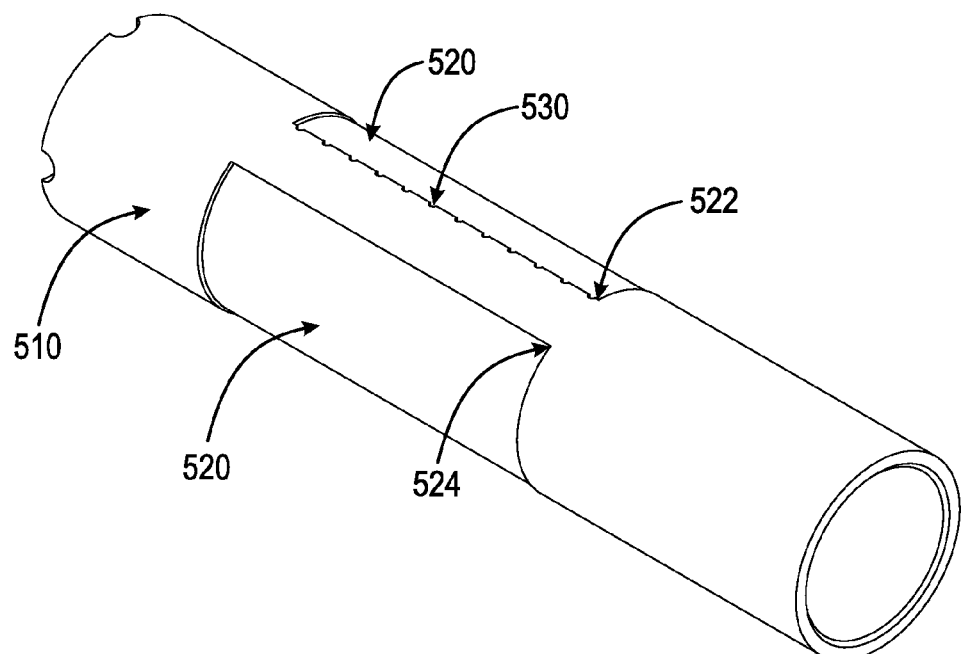
FIGS. 5A and 5B are schematic drawings of shock tubes with at least one tapered patch according to example embodiments of the invention.
Figure 5B:
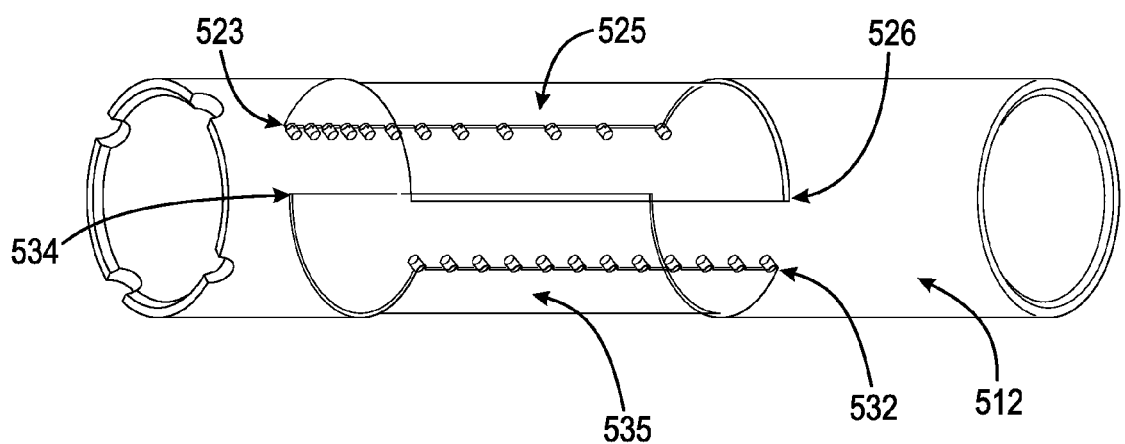

FIGS. 5A and 5B are schematic drawings of example shock tubes 510, 512 with at least one tapered patch 520 or 525, 535 according to example embodiments of the invention. The example shock tube 510 shown in FIG. 5A, for example, includes on the outside diameter of the shock tube 510 a circumferential tapered patch 520. The tapered patch 520 at one end is of a certain depth 522 in the shock tube 510 and tapers to a lesser depth 524 at the other end of the patch 520. For example, the tapered patch 520 may extend about 350 degrees around the outside diameter of the shock tube 510, and may start at a certain depth 522 at one end and taper to a depth of zero 524 at the other end of the patch 520, about 350 degrees from where the patch 520 started. A slot cut axially along the length of the external cylinder (not shown) interfaces the patch 520 to allow for oil/fluid to flow through the orifices 530, patch 520, and slot (not shown). The slot is similar to that of the flow channel 240 shown in FIG. 2, but may be much narrower. In many embodiments, the patch 520 starts at and spans the length of the shock tube's orifice pattern 530. In some embodiments, as shown in FIG. 5B, for example, a shock tube 512 may include multiple tapered patches 525, 535 that start and end at differing points 523, 526, 532, 534 around the shock tube 512, and the external cylinder may include multiple corresponding slots (not shown).

Referring to FIG. 5A, for example, when the slot of the external cylinder is aligned with a certain part of the tapered patch 520, the tapered patch 520 presents a resulting projected area and flow path for the oil/fluid of the device to travel. The projected area is based on the width and depth of the patch 520 and the width of the slot. When the shock tube 510 is rotated relative to the external cylinder, the slot of the external cylinder is aligned with different parts of the tapered patch 520. As the depth of the patch 520 changes, due to rotation of the shock tube 510 relative to the external cylinder, so does the projected area through which the oil/fluid may travel. By rotating the shock tube 510 relative to the external cylinder and, thus, changing the projected area, the shock absorber damping can be adjusted.

The example shock tubes 510, 512 of FIGS. 5A and 5B are suitable for use in an energy absorption device that includes an external cylinder housing member, shock tube, piston, and accumulator, where the shock tube 510, in the case of the shock tube of FIG. 5A, for example, is rotatably secured within the external cylinder and has an interior surface, an exterior surface, and a group of inline holes 530 along the long axis of the shock tube 510. In such a device, each hole 530 passes from the interior surface of the shock tube 510 to the exterior surface of the shock tube 510 to allow fluid to pass therethrough. The shock tube 510 also has a tapered patch 520 on the exterior surface of the shock tube 510. The tapered patch 520 starts at the location of the group of inline holes 530 and is of a first depth 522 into the exterior surface of the shock tube 510. The tapered patch 520 ends at another location around the circumference of the shock tube 510 and is of a second depth 524 into the exterior surface of the shock tube 510. The second depth 524 is less than the first depth 522, and the depth of the tapered patch 520 tapers from the first depth 522 to the second depth 524.

In such an energy absorption device, the external cylinder has a distal end, a proximal end, an interior wall, and a flow channel formed on the interior wall of the external cylinder (not shown). The flow channel substantially extends along the length of the external cylinder and is in fluid communication with the accumulator. The piston includes a head portion and a rod portion. The head portion is slidably retained within the shock tube, and the rod portion extends from the head portion through the proximal end of the external cylinder and engages with an external body in motion. The accumulator is contained within the external cylinder and collects fluid from the interior of the shock tube when the head portion of the piston moves toward the distal end of the external cylinder. Relative rotation between the shock tube 510 and the external cylinder changes which part of the tapered patch 520 interfaces the flow channel to adjustably change the rate of fluid flow out of the shock tube, through the group of inline holes 530, through the tapered patch, through the flow channel, and into the accumulator. Such rotation, thus, changes the dampening of the energy absorption device.

An example advantage of embodiments using the disclosed tapered patch is that machining costs can be reduced. Rather than manufacturing a shock tube with several close tolerance machine cuts, inclusion of the patch allows for a faster, simpler large cut that is less expensive to manufacture.

Figure 6:
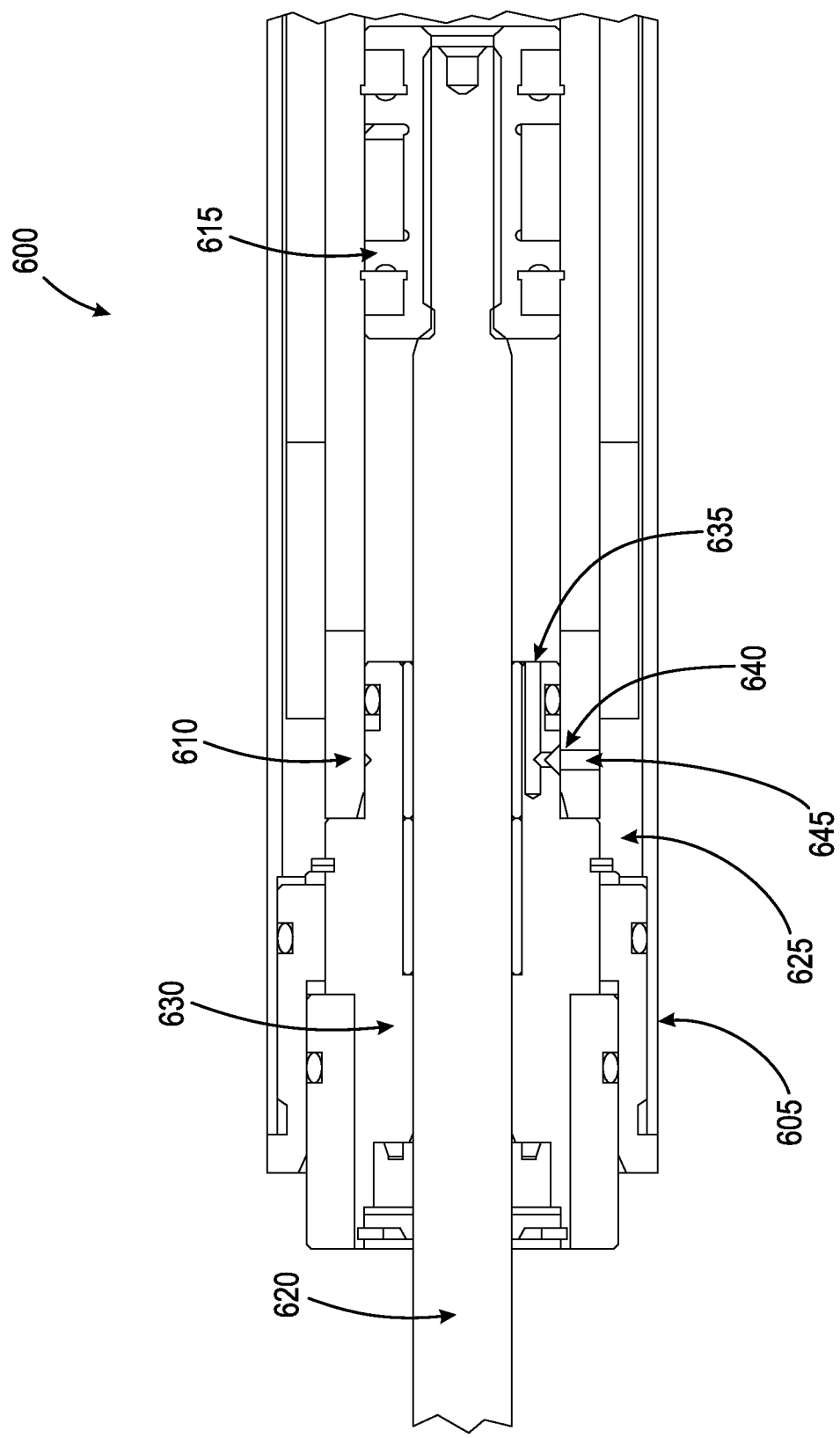
FIG. 6 is a cross-section schematic drawing of an energy absorption device with a tapered groove on a cylinder end used for damping adjustment according to an example embodiment of the invention.

FIG. 6 is a cross-section schematic drawing of an energy absorption device 600 with a tapered groove (end groove) 640 on a cylinder end 630 used for damping adjustment according to an example embodiment of the invention. Such a groove 640 on a cylinder end 630 can be either in combination with an orifice pattern (not shown) through the shock tube 610 wall, or alone. An orifice being through the cylinder end 630, by virtue of its size and flow characteristics, yields unique damping characteristics as compared to an orifice being through the shock tube 610 wall, including dashpot damping and the potential to deliver damping and shock force proportional to a sublinear power of an impact velocity.

For example, in any of the embodiments disclosed above, the energy absorption device may include a cylinder end 630 at the proximal end of the external cylinder 605, an end groove 640 on the exterior surface of the cylinder end 630, a first orifice 635 in the cylinder end 630, and a second orifice 645 in the shock tube 610. The end groove 640 starts at a first location on the exterior surface of the cylinder end 630 and is of a first depth into the exterior surface of the cylinder end 630. The end groove 640 ends at a second location around the circumference of the cylinder end 630 and is of a second depth into the exterior surface of the cylinder end 630. The second depth of the end groove 640 is less than the first depth of the end groove 640, and the depth of the end groove 640 tapers from the first depth of the end groove 640 to the second depth of the end groove 640. The first orifice 635 (in the cylinder end) is in fluid communication with the interior of the shock tube 610 and the end groove 640, and allows fluid to flow from the interior of the shock tube 610 to the end groove 640 when the head portion 615 of the piston moves toward the proximal end of the external cylinder 605. The second orifice 645 (in the shock tube) is in fluid communication with the end groove 640 and the accumulator 625, and allows fluid to flow from the end groove 640 to the accumulator 625 when the head portion 615 of the piston moves toward the proximal end of the external cylinder 605. Relative rotation between the shock tube 610 and the external cylinder 605 changes which part of the end groove 640 interfaces the second orifice 645 (in the shock tube) to adjustably change the rate of fluid flow out of the shock tube 610, through the first orifice 635 (in the cylinder end), through the end groove 640, through the second orifice 645 (in the shock tube), and into the accumulator 625. Such rotation changes the dampening of the energy absorption device.

As an alternative to the end groove being on the exterior surface of the cylinder end 605, the end groove can be on the interior surface of the shock tube 610, or located in the exterior surface of the shock tube 610. In addition, the end groove may be located at the opposite end of the device than the accumulator 625 (e.g., at the distal end of the embodiment shown in FIG. 6), and in such embodiments, an axial groove may be cut on the outside diameter of the shock tube 610 to provide a flow path to the accumulator area 625.

While this invention has been particularly shown and described with references to example embodiments thereof, it will be understood by those skilled in the art that various changes in form and details may be made therein without departing from the scope of the invention encompassed by the appended claims.

What is claimed is:

1. An energy absorption device comprising:
   an external cylinder housing member having a distal end, a proximal end, and an interior wall;
   a shock tube being rotatably secured within the external cylinder and having:
      an interior surface;
      an exterior surface;
      a group of inline holes along the long axis of the shock tube, each hole passing from the interior surface of the shock tube to the exterior surface of the shock tube to allow fluid to pass therethrough; and
      a tapered patch on the exterior surface of the shock tube, the tapered patch starting at the location of the group of inline holes and being of a first depth into the exterior surface of the shock tube, and ending at another location around the circumference of the shock tube and being of a second depth into the exterior surface of the shock tube, the second depth being less than the first depth, and the depth of the tapered patch tapering from the first depth to the second depth;
   a piston including a head portion and a rod portion, the head portion being slidably retained within the shock tube, and the rod portion extending from the head portion through the proximal end of the external cylinder and configured to be engaged with an external body in motion;
   an accumulator, contained within the external cylinder, to collect fluid from the interior of the shock tube when the head portion of the piston moves toward the distal end of the external cylinder; and
   a flow channel formed on the interior wall of the external cylinder, substantially extending along the length of the external cylinder, and in fluid communication with the accumulator, relative rotation between the shock tube and the external cylinder changing which part of the tapered patch interfaces the flow channel to adjustably change the rate of fluid flow out of the shock tube, through the group of inline holes, through the tapered patch, through the flow channel, and into the accumulator, said rotation changing dampening of the energy absorption device.

2. An energy absorption device as in claim 1 wherein the tapered patch extends substantially around the circumference of the shock tube.

3. An energy absorption device as in claim 1 wherein the first depth of the tapered patch is substantially the thickness of the shock tube, and wherein the second depth of the tapered patch is zero.

4. An energy absorption device as in claim 1 wherein the width of the flow channel is at least the width of the group of inline holes.

5. An energy absorption device as in claim 1 wherein the dampening of the energy absorption device is based on a projected area of the width and depth of the tapered patch at the point interfacing the flow channel at a given time.

6. An energy absorption device as in claim 1 wherein the length of the tapered patch along the long axis of the shock tube spans the group of inline holes.

7. An energy absorption device as in claim 1 further comprising:
   multiple groups of inline holes along the long axis of the shock tube, each group of inline holes being positioned at different locations around the circumference of the shock tube; and
   multiple tapered patches corresponding to the multiple groups of inline holes, each tapered patch starting at the location of a corresponding group of inline holes.

8. An energy absorption device as in claim 7 wherein each group of inline holes is configured to provide a different type of damping selected from square wave damping, dashpot damping, progressive damping, and self-compensating damping.

9. An energy absorption device as in claim 7 further comprising:
multiple flow channels corresponding to the multiple groups of inline holes, each flow channel being formed at different locations around the interior wall of the external cylinder.

10. An energy absorption device comprising:
an external cylinder housing member having a distal end, a proximal end, and an interior wall;
a shock tube being rotatably secured within the external cylinder and having:
an interior surface;
an exterior surface;
a group of inline holes along the long axis of the shock tube, each hole passing from the interior surface of the shock tube to the exterior surface of the shock tube to allow fluid to pass therethrough; and
a group of tapered grooves, corresponding to the group of inline holes, on the exterior surface of the shock tube, each tapered groove starting at the location of a corresponding hole and being of a first depth into the exterior surface of the shock tube, and ending at another location around the circumference of the shock tube and being of a second depth into the exterior surface of the shock tube, the second depth of the groove being less than the first depth of the groove, and the depth of the groove tapering from the first depth to the second depth;
a piston including a head portion and a rod portion, the head portion being slidably retained within the shock tube, and the rod portion extending from the head portion through the proximal end of the external cylinder and configured to be engaged with an external body in motion;
an accumulator, contained within the external cylinder, to collect fluid from the interior of the shock tube when the head portion of the piston moves toward the distal end of the external cylinder; and
a flow channel formed on the interior wall of the external cylinder, substantially extending along the length of the external cylinder, and in fluid communication with the accumulator, relative rotation between the shock tube and the external cylinder changing which parts of the tapered grooves interface the flow channel to adjustably change the rate of fluid flow out of the shock tube, through the group of inline holes, through the tapered grooves, through the flow channel, and into the accumulator, said rotation changing dampening of the energy absorption device.

11. An energy absorption device as in claim 10 wherein the tapered grooves extend substantially around the circumference of the shock tube.

12. An energy absorption device as in claim 10 wherein the first depth of the tapered grooves is substantially the thickness of the shock tube, and wherein the second depth of the tapered grooves is zero.

13. An energy absorption device as in claim 10 wherein the width of the flow channel is at least the width of the group of inline holes.

14. An energy absorption device as in claim 10 wherein the dampening of the energy absorption device is based on a cumulative projected area of the width and depth of the tapered grooves at the points interfacing the flow channel at a given time.

15. An energy absorption device as in claim 10 wherein the tapered grooves end at different locations around the circumference of the shock tube.

16. An energy absorption device as in claim 10 further comprising:
multiple groups of inline holes along the long axis of the shock tube, each group of inline holes being positioned at different locations around the circumference of the shock tube; and
multiple groups of tapered grooves corresponding to the multiple groups of inline holes, each group of tapered grooves starting at the locations of a corresponding group of inline holes.

17. An energy absorption device as in claim 10 further comprising:
a cylinder end at the proximal end of the external cylinder;
an end groove on the exterior surface of the cylinder end, the end groove starting at a first location on the exterior surface of the cylinder end and being of a first depth into the exterior surface of the cylinder end, and ending at a second location around the circumference of the cylinder end and being of a second depth into the exterior surface of the cylinder end, the second depth of the end groove being less than the first depth of the end groove, and the depth of the end groove tapering from the first depth of the end groove to the second depth of the end groove;
a first orifice in the cylinder end, the first orifice being in fluid communication with the interior of the shock tube and the end groove, and allowing fluid to flow from the interior of the shock tube to the end groove when the head portion of the piston moves toward the proximal end of the external cylinder;
a second orifice in the shock tube, the second orifice being in fluid communication with the end groove and the accumulator, and allowing fluid to flow from the end groove to the accumulator when the head portion of the piston moves toward the proximal end of the external cylinder, relative rotation between the shock tube and the external cylinder changing which part of the end groove interfaces the second orifice to adjustably change the rate of fluid flow out of the shock tube, through the first orifice, through the end groove, through the second orifice, and into the accumulator, said rotation changing dampening of the energy absorption device.

18. An energy absorption device comprising:
an external cylinder housing member having a distal end, a proximal end, and an interior wall;
a shock tube being rotatably secured within the external cylinder and having an interior surface, an exterior surface, and multiple groups of holes, each group of holes being positioned at different locations around the circumference of the shock tube, each hole passing from the interior surface of the shock tube to the exterior surface of the shock tube to allow fluid to pass therethrough;
a piston including a head portion and a rod portion, the head portion being slidably retained within the shock tube, and the rod portion extending from the head portion through the proximal end of the external cylinder and configured to be engaged with an external body in motion;
an accumulator, contained within the external cylinder, to collect fluid from the interior of the shock tube when the head portion of the piston moves toward the distal end of the external cylinder; and a flow channel formed on the interior wall of the external cylinder, substantially extending along the length of the external cylinder, and in fluid communication with the accumulator, the flow channel having a width configured to align with one group of the multiple groups of holes, relative rotation between the shock tube and the external cylinder changing which group of holes are aligned with the flow channel to selectably change the rate of fluid flow out of the shock tube, through the holes aligned with the flow channel, through the flow channel, and into the accumulator, said rotation changing dampening of the energy absorption device.

19. An energy absorption device as in claim 18 wherein the multiple groups of holes are arranged in a spiral pattern around the circumference of the shock tube.

20. An energy absorption device as in claim 18 wherein each group of holes is configured to provide a different type of damping selected from square wave damping, dashpot damping, progressive damping, and self-compensating damping.

* * * * *